United States Patent [19]

Ross

[11] 4,122,875
[45] Oct. 31, 1978

[54] CAN FILLING APPARATUS AND METHODS AND APPARATUS AND METHODS FOR CONVEYING AND CONTROLLING THE FEEDING OF WET MATERIALS

[75] Inventor: Edward E. Ross, San Rafael, Calif.

[73] Assignee: Del Monte Corporation, San Francisco, Calif.

[21] Appl. No.: 782,924

[22] Filed: Mar. 30, 1977

[51] Int. Cl.² .............................................. B65B 1/08
[52] U.S. Cl. ...................................... 141/11; 141/69; 198/367; 198/598
[58] Field of Search ................... 53/21 R; 141/11, 12, 141/69, 71-74, 81, 131, 138-143, 153, 192, 180, 198, 256, 224; 198/367, 560, 598, 599, 631, 637

[56] References Cited
U.S. PATENT DOCUMENTS

| 3,159,270 | 12/1964 | Johnston | 198/631 X |
|---|---|---|---|
| 3,709,353 | 1/1973 | Sheetz | 198/367 |
| 4,019,547 | 4/1977 | Ross | 141/11 |

Primary Examiner—Richard E. Aegerter
Assistant Examiner—Frederick R. Schmidt
Attorney, Agent, or Firm—Flehr, Hohbach, Test, Albritton & Herbert

[57] ABSTRACT

Apparatus and methods for filling cans with measured amounts of wet material, having improved methods and procedures for the conveying and controlling the feeding of such materials. Feeding from a conveyer belt employs a deflecting barrier having two or more adjacent rotating rollers. The height of the column of material maintained in an upright tube of the can filling unit is controlled by an electrical probe assembly and associated electronic circuitry. The probe of the assembly is positioned above the column of material, and the arrangement is such that when it is contacted by the upper surface of the column, the associated circuitry effects a reduction in the feed of material to the column.

10 Claims, 12 Drawing Figures

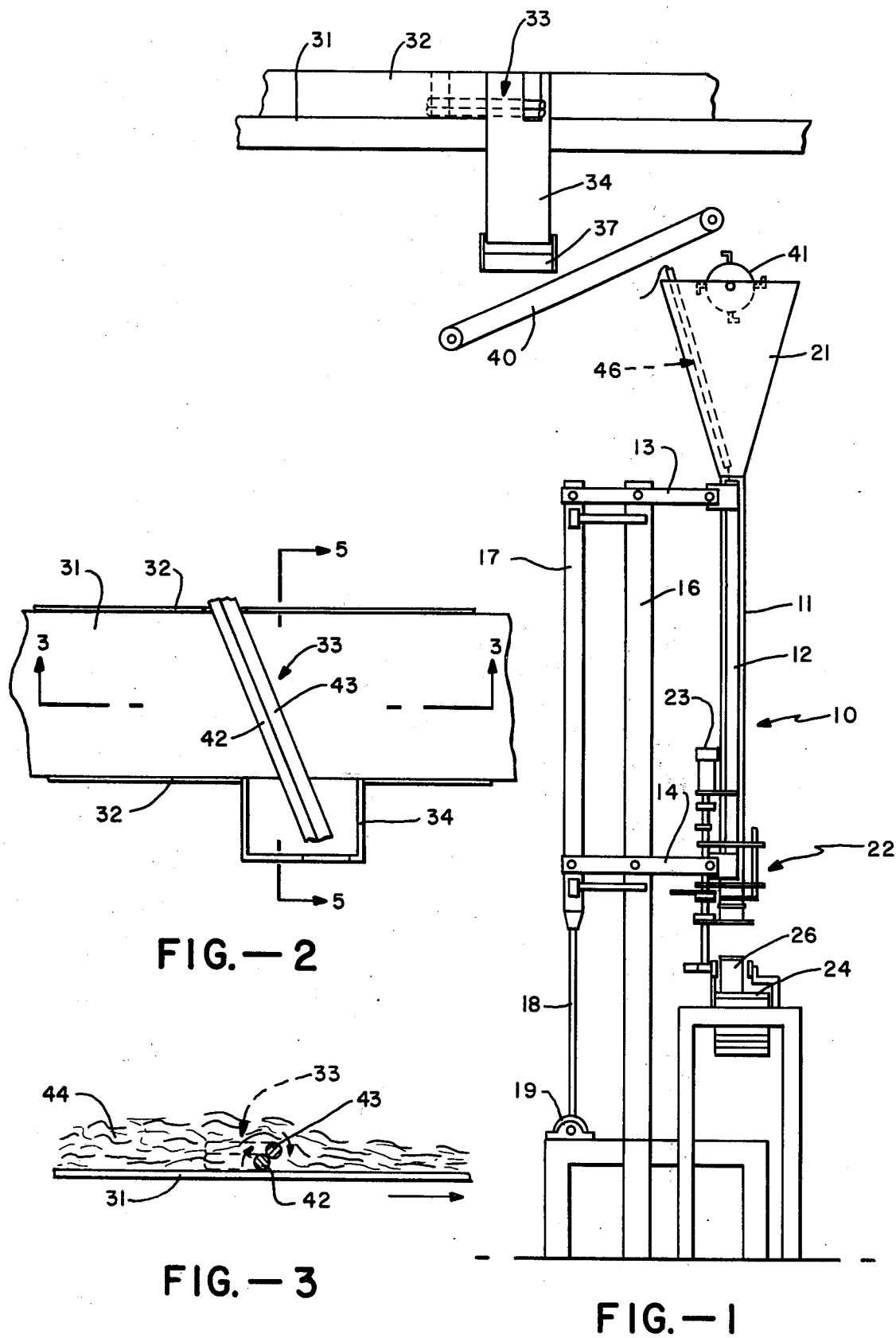

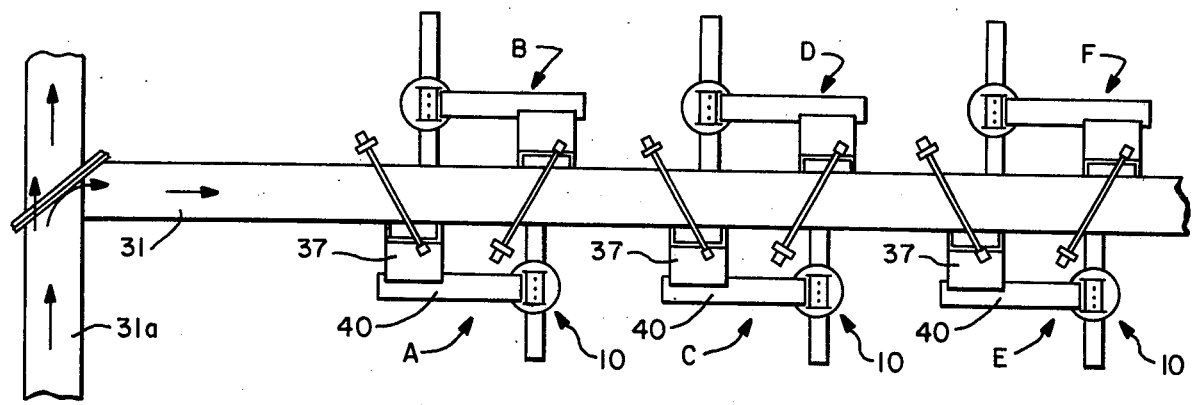
FIG.—4
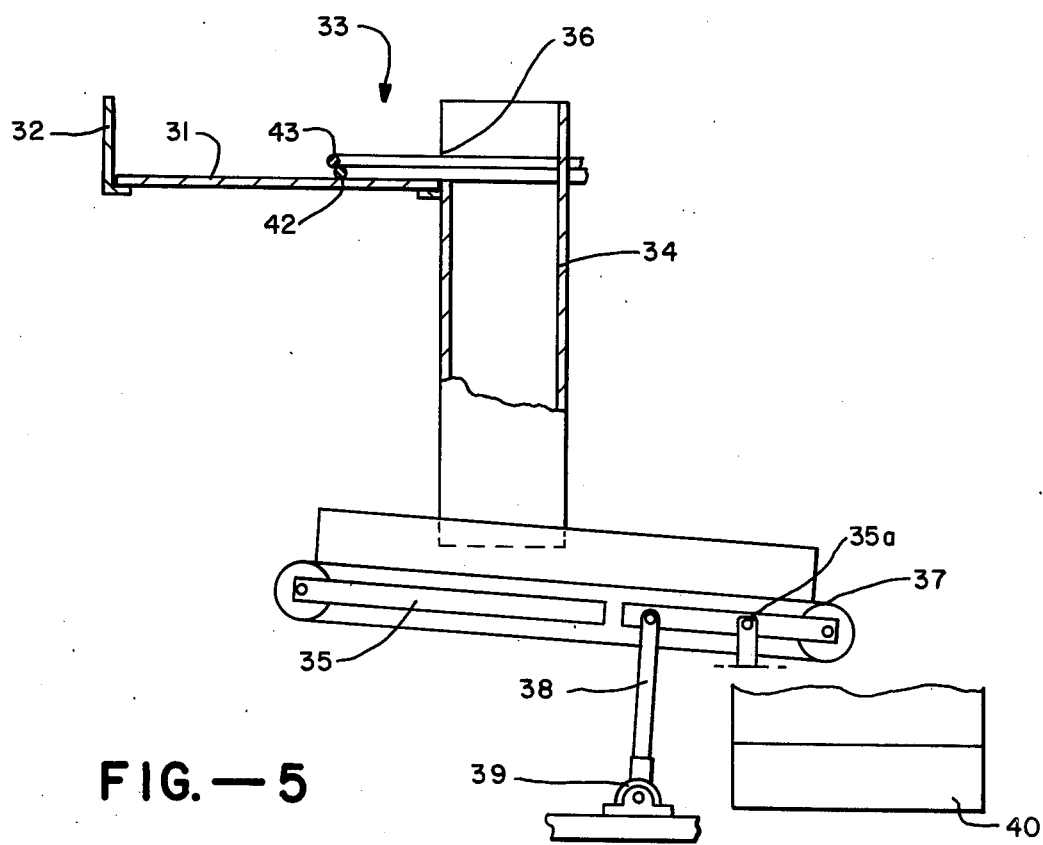
FIG.—5

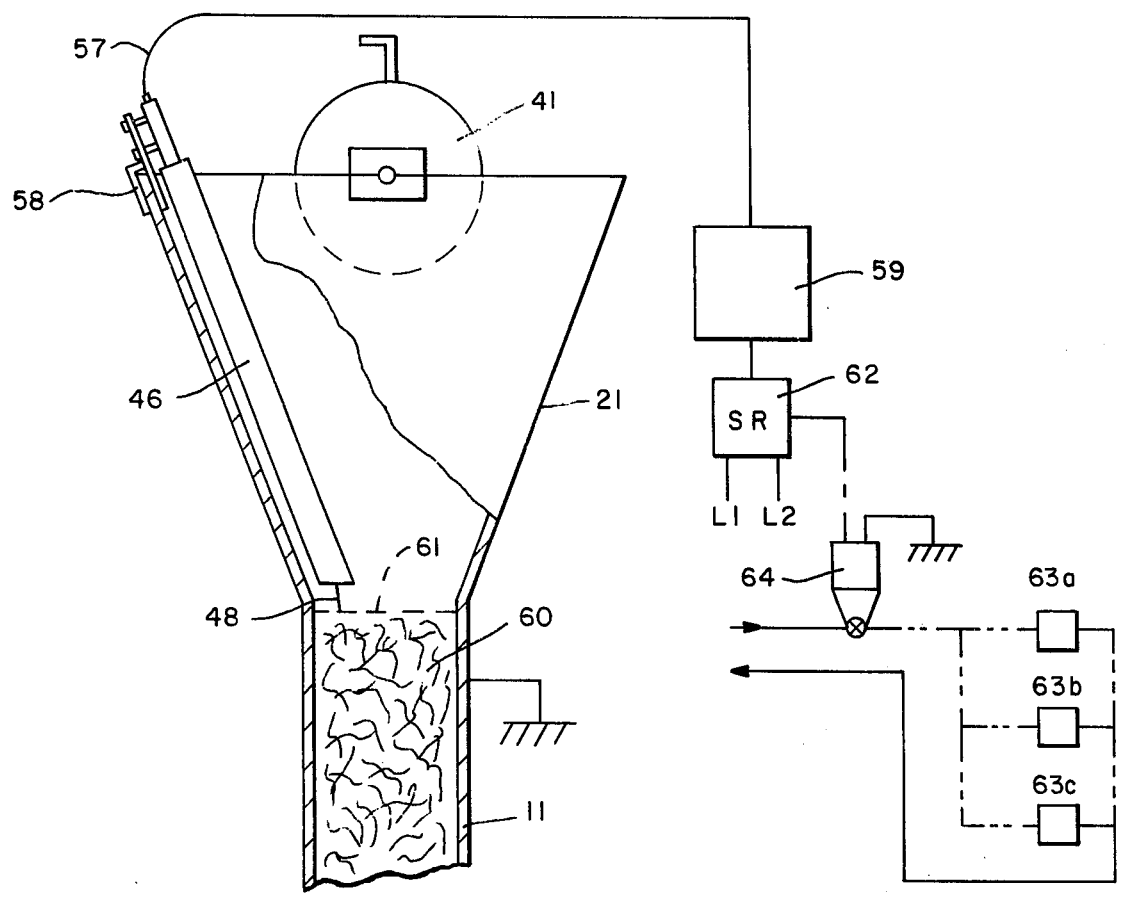
FIG.—8
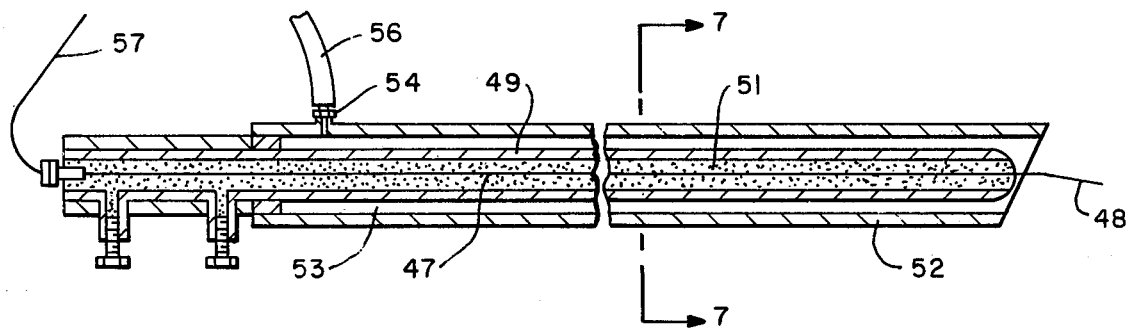
FIG.—6
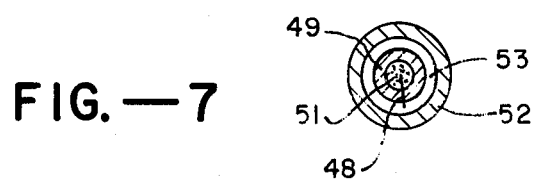
FIG.—7

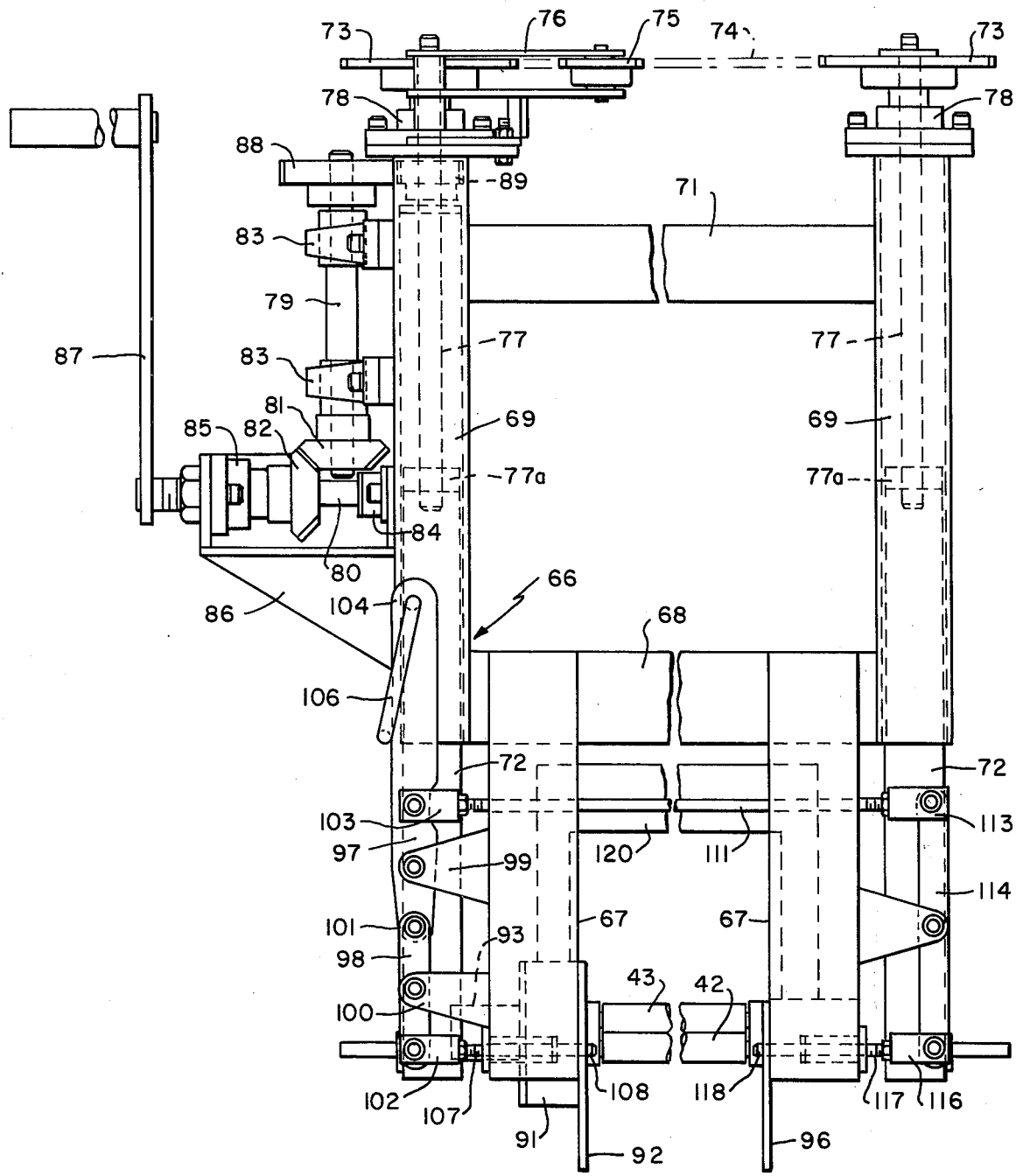
FIG.—9

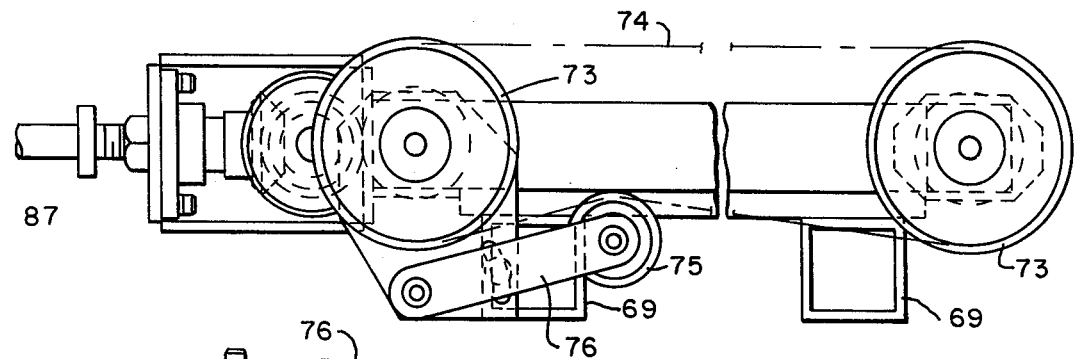
FIG.—10
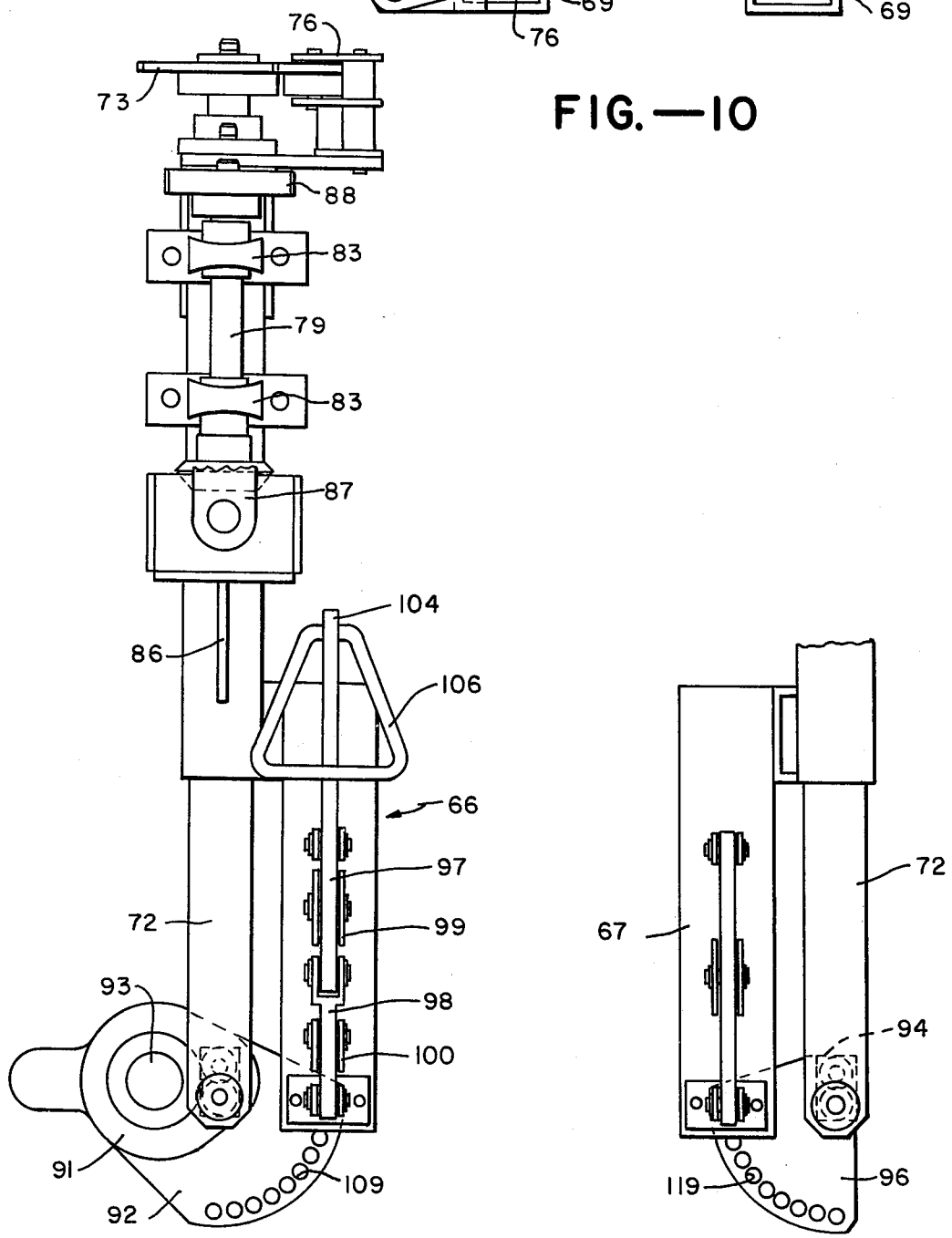
FIG.—11
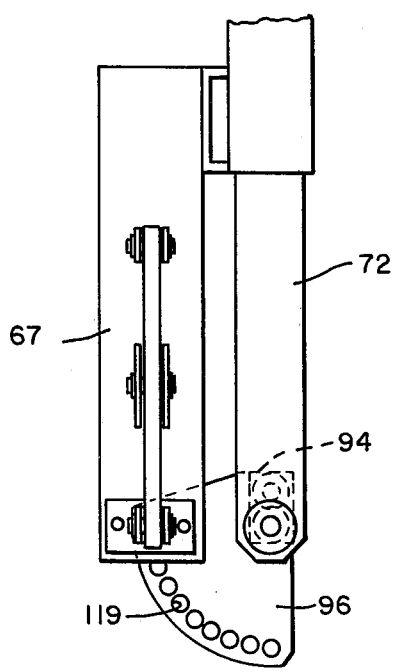
FIG.—12

CAN FILLING APPARATUS AND METHODS AND APPARATUS AND METHODS FOR CONVEYING AND CONTROLLING THE FEEDING OF WET MATERIALS

BACKGROUND OF THE INVENTION

This invention relates generally to can filling apparatus and methods applicable to the handling of wet food materials, such as blanched spinach. It also relates to apparatus and methods for conveying and feeding such materials to one or more stations where can filling units may be located, and to apparatus and methods for automatically controlling feeding of material.

In my copending application Ser. No. 669,327, filed Mar. 22, 1976 now U.S. Pat. No. 4,019,547 and entitled "Can Filling Method and Apparatus", there is disclosed an apparatus and method which is applicable for filling cans with wet food material, like blanched spinach, with a high degree of accurracy with respect with the weight of material supplied to each can. The apparatus in that instance makes use of an upright tube open at its upper end to receive the wet material, and having means at its lower end to successively cut off equal volumes of the materials for introduction into underlying cans. The upper open end of the tube communicates with a hopper, and feed means delivers the material to a region from which it is dropped into the hopper. More particularly, as shown in said application, the feed means consists of an elevating conveyer which takes the material from the lower supply bin and delivers it to fluffing means overlying the hopper of the tube, which in turn permits the material to drop into the tube. In the operation of such apparatus, it has been customary to provide a supply conveyor which conveys the blanched spinach to the feed bin of one or more of the can filling units. A workman at each station controls operation of a hydraulically powered gate that is moved transversely back and forth over the conveyer belt to fill the feed supply bin. This method has been found objectionable because when one conveyor is supplying, say, eight filling units located at stations distributed along the conveyer, one or more of the stations may not receive sufficient spinach for continuous uninterrupted operation.

The claw type elevating conveyer disclosed in said U.S. Pat. No. 4,019,547 Ser. No. 669,327 which raises the spinach from the feed bin to a level above the hopper connected to the tube is arranged to drop the spinach on the rotating fluffer. A rake-off conveyer is disposed immediately above the discharge end of the elevating conveyor and is driven at a speed somewhat greater than that of the elevating conveyer, whereby the material is dragged off the end of the elevating conveyer and dropped upon the fluffer. It has been found that this type of feed arrangement is subject to variations in the rate of feed, thus complicating the problem of maintaining the column of material in the upright tube at a constant height. In addition the claw type of elevating conveyer is expensive and difficult to keep clean.

For the purpose of automatically maintaining a column of material of constant height in the tube of the can filling assembly, pneumatic sensors are disclosed in said U.S. Pat. No. 4,019,587 Ser. No. 669,327, which function to shut off the drive to the elevating conveyer when the column of material exceeds a predetermined height. It has been found that this type of control is not as sensitive or reliable as desired, which is attributed in part to condensation of moisture in the small passages or orifices through which air is discharged into one side of the vertical tube. In addition, such a sensing arrangement requires use of a tube sufficiently long to provide an extension at its upper end where the sensing devices are located.

OBJECTS OF THE INVENTION AND SUMMARY

In general it is an object of the present invention to improve upon machines of the type disclosed in said U.S. Pat. No. 4,019,547, having reference particularly to improving the machine with respect to the feeding of wet material to the can filling apparatus, and controlling the height of the column of wet material in the tube into which the wet material is introduced.

Another object is to provide improved means for diverting or shearing off wet material like spinach from a conveyer belt which will perform its desired function without jamming or hang-up of the material. In this connection the invention is characterized by the use of a barrier disposed across the upper surface of the conveyer belt and consisting of a plurality of driven rollers arranged in parallel juxtaposition and disposed adjacent the conveyor belt surface.

Another object is to provide improved feed means for delivering material from the main supply conveyor to regions overlying the can filling units, which provides more uniform feeding of the wet material to the tubes of the can filling units.

Another object is to provide improved means for sensing when the column of wet material in the upright tube reaches a predetermined height, which is simpler and more effective than the pneumatic means disclosed in said U.S. Pat. No. 4,019,547. In this connection, the invention makes use of an electrically conductive probe which is disposed whereby its upper end is in the upper portion of the upright tube and which is contacted when the surface level of the column of material reaches a predetermined height. The probe assembly is constructed and operated in such a manner that a stream of air is continuously discharged downwardly about the probe, thereby preventing any hang-up of wet material on the probe or its surrounding casing, or short-circuiting due to wetting.

Another object is to improve the means located in the region above the upright tube for feeding the wet material and causing the same to drop into the tube, which functions to reduce or interrupt the feed when the column of material in the tube exceeds a predetermined height. The feed means is characterized by use of a surge hopper which receives material from a distributing conveyer and delivers it to a feed conveyor, the latter being driven by motive means which is automatically disabled when the height of the column of wet material in the upright tube reaches a predetermined level.

In general, the sensing apparatus forming a part of the invention consists of a downwardly extending electrically conductive probe disposed above the upper surface of the material, the height of which is to be sensed, the probe being surrounded by a housing or casing which forms a gas flow passage which is open about the probe at its lower end. Means is provided for continuously supplying a stream of air or gas to the housing whereby the air stream is continuously discharged downwardly about the probe. The probe is connected to electronic circuitry which serves to indicate contact of the material with the probe. Such a probe is incorporated with the can filling apparatus disclosed in said U.S. Pat. No. 4,019,547, whereby the probe is disposed in the upper end portion of the upright tube in which the column of material is maintained. The electrical circuitry is arranged to control the means employed for feeding material to the upper end of the upright tube of the can filling means when the height of the column of material in the tube reaches a predetermined level. The invention also includes the method involved when the apparatus is used for the purposes intended.

Further objects and features of the invention will appear from the following description in which the preferred embodiment has been set forth in detail in conjunction with the accompanying drawing.

BRIEF DESCRIPTION OF THE DRAWING

FIG. 1 is a side elevational view schematically illustrating an apparatus of the general type disclosed in U.S. Pat. No. 4,019,547, together with a distribution conveyor and means for diverting material from the conveyer or for feeding the material to the can filling portion of the apparatus.

FIG. 2 is a schematic plan view illustrating the means employed for diverting material from the distribution conveyor to the hopper of the means illustrated in FIG. 1 for feeding the material to the can filling part of the apparatus.

FIG. 3 is a detail in section taken along the line 3—3 of FIG. 2.

FIG. 4 is a schematic view in plan illustrating a plurality of can filling units located at different stations along a distribution conveyor and all being supplied with wet material from the distribution conveyor.

FIG. 5 is an end view, partly in section, taken on the line 5—5 of FIG. 2 and showing some of the parts for feeding material to the can filling means.

FIG. 6 is a cross-sectional view illustrating the probe assembly.

FIG. 7 is a cross-sectional view taken along the line 7—7 of FIG. 6.

FIG. 8 is a side elevational view partly in section illustrating the manner in which the probe assembly is assembled with the hopper of the upright tube and is connected with circuitry for controlling the feed means.

FIG. 9 is a side elevational view of the assembly for mounting the rollers and for enabling certain adjustments of the rollers.

FIG. 10 is a plan view of the assembly shown in FIG. 9.

FIG. 11 is an end view looking toward the left hand end of FIG. 9.

FIG. 12 is an end view looking toward the right hand end of FIG. 9.

DESCRIPTION OF THE PREFERRED EMBODIMENTS

The apparatus as illustrated in FIG. 1 consists generally of a can filling unit 10 which is similar to the filling unit illustrated in FIG. 3 of said Pat. No. 4,019,547. It consists of a vertical tube 11 carried by the side structural members 12, which in turn are pivotally connected to the ends of the upper and lower shaking levers 13 and 14. These levers are pivotally carried by the structural member 16 of the machine frame. They are also pivotally connected to a vertical bar 17 which in turn is connected by rod 18 with the eccentric 19. The eccentric is driven by a suitable motor (not shown) whereby vertical shaking movement is applied to the counterweight bar 17, to the structural members 12 and to the associated tube 11. The feed upper end of the tube 11 communicates with the hopper or funnel 21, which is open at its upper end to receive the feed material. At the lower end of the tube there is an assembly designated generally at 22 consisting of a filler pocket together with a cut-off knife and a closure plate, the knife and closure plate being driven by suitable means such as the motor 23, all as described in said copending application. Below the assembly 22 there is a can conveyer 24 for the purpose of presenting cans 26 to positions immediately below the assembly 22 for successive filling.

As described in said copending application, wet material like blanched spinach is fed to the region above the hopper 21 and dropped into the hopper and the tube 11, thereby forming and maintaining a column of wet material within the tube. Assuming that the column of material is maintained at a substantially constant height, the material during its downward progression is subjected to gradually increasing compaction, with the development of a predetermined amount of compaction in the lower portion of the tube. Thus when successive portions of equal volume are severed from the lower end of the column, they are of substantially constant weight, since the material in the bottom portion of the column has a constant weight-to-volume ratio The improved conveyer and feed means of the present invention are as follows. A belt-type distribution conveyer 31 is provided which has a relatively smooth or unobstructed belt surface. In a normal plant installation this distribution conveyer serves to deliver material to a plurality of filling units. The upper run of the conveyer 31 is provided with the usual side plates 32, and at each station where material is to be supplied to a can filling unit, there is a barrier 33 which extends across the surface of the belt at an angle of less than 90° (e.g., 45°), and which serves to shear off and divert a certain amount of material from the conveyer and deliver it into the side surge hopper 34. At its upper end the hopper 34 is open at one side (FIG. 5) as indicated at 36, to the space above the conveyer belt 31. Thus it receives wet material displaced from the upper surface of the belt by the barrier 33. The lower open end of the surge hopper 34 delivers the material to the upper run of the endless belt conveyer 37. The frame portion 35 of the conveyer 37 as shown in FIG. 5 is pivotally carried at 35a by a suitable support frame. The frame is connected by rods 38 to suitable mechanical eccentrics 39, whereby the conveyer is shaken in a vertical direction by operation of a motor connected to the common shaft of the eccentrics. At the discharge end of the conveyer 37 there is a cross-conveyer 40 which as shown in FIG. 1 carries the material to a region directly over the central portion of the hopper 21, and then drops it downwardly upon the fluffing wheel 41. The conveyer 40 is driven by another motor (not shown). The fluffing wheel is carried directly by the hopper and is driven by suitable motor means. It may be constructed as shown in said copending application.

The barrier means 33 for diverting the wet material from the conveyer can be understood by reference to FIGS. 2 and 3. It consists of an assembly of rollers 42 and 43 which extend parallel to each other and which are arranged to extend across the upper run of the conveyer belt 31 at an angle of less than 90°. In practice, it has been found that an angle of 45° gives good results. The positioning of the rollers is such that the lowermost roller is in contact with the conveyer belt, while the upper roller has its peripheral surface spaced a slight distance from the peripheral surface of the lower roller, as for example, a space of the order of 0.010 inches. As will be presently described, at one end of the assembly the ends of the rollers 42 and 43 are carried by a suitable bearing block, and the other extremities are carried by a gear box and driven by a suitable means. The direction of rotation is indicated in FIG. 3, and is such that the lower roller rotates clockwise when the conveyer is moving from left to right, and the upper roller is likewise driven in the same direction. Thus the peripheral surface of the lower roller adjacent the conveyer moves in a direction opposite to the conveyer movement, and the lower portion of the surface of the upper roller 43 moves over the adjacent surface of the roller 42 in a direction opposite to the conveyer movement. It will also be noted in FIG. 3 that the line of centers of the rollers 42 and 43, as viewed from one side of the conveyer, is inclined in the direction of conveyer movement. As will be presently explained, the rollers are preferably mounted in such a manner that the angle of the line of centers with respect to the conveyer belt may be adjusted between substantially 0° and 90°. In practice, good results are obtained by angles between about 20° and 60°. By changing the angles of the line of centers with respect to the conveyer belt, the overall height of the carrier can be adjusted, and this adjustment serves to adjust the amount of wet material which is sheared and diverted from the conveyer.

The rollers 42 and 43 may vary in size and may be of the same or different diameters. In practice, the rollers have been of the same size, ranging from 1 to 1½ inches in diameter.

The method of operation of the diverter described above is as follows. As shown in FIG. 3 a layer of wet material 44 is being moved along by the conveyer belt. The rollers 42 and 43 are driven constantly as described above, as for example, at a speed of from 600 to 1000 revolutions per minute. The mass of wet material being urged by the conveyer belt toward the rollers 42 and 43 is subjected to shearing forces due to the inclination of the axes of the rollers to the conveyer belt. Assuming that the mass of material is of a height substantially greater than the overall height of the rollers 42 and 43, a lower portion of the mass of material is sheared off and diverted laterally from the lower part of the mass and discharged toward one side of the conveyer and into the surge hopper 34. When surge hopper 34 becomes completely filled, which may occur during periods that the conveyors 37 and 40 are not operating, blocking of further material causes the conveyed material to pass over the barrier even though the normal depth of the material on the belt is not greater or even less than the barrier height. During this shearing and diverting action the wet material (e.g., spinach) does not find its way between the roller 42 and the upper surface of the belt, or between the rollers, due to the manner in which the rollers are continuously rotated and their close apposition to each other and the contact with the upper surface of the belt. Likewise, there is no tendency for leafy or stringy wet material to become wound about the rollers. When the angle between the line of centers between the rollers and the conveyer belt is increased toward 90° or vertical, the forces tending to divert material to one side of the conveyer are increased and this together with the increased height of the barrier serves to increase the amount of material being diverted. Again assuming that the thickness of the layer of material on the conveyer belt is substantially greater than the overall height of the rollers 42 and 43 or that the adjacent surge hopper is completely filled, the material that is not diverted and which passes over the rollers proceeds on to the next station. It will be evident that by supplying sufficient material to the conveyer, the material may be diverted at a plurality of successive stations to separate can filling units.

While the barrier 33 described above employs two rollers, additional rollers can be employed provided they are all driven in the same direction.

FIG. 1 illustrates a probe assembly 46 disposed within the hopper 21 and extending downwardly to a point within the upper portion of the tube 11. As shown in FIGS. 6 and 7, this assembly consists of a conductor 47 which has an end portion or tip 48 functioning as a probe. The conductor extends within a tube 49 and is surrounded by suitable insulating material 51, such as epoxy resin, in the space about the conductor 47. Tube 49 is disposed within a larger housing 52 which may be annular in section and dimensioned to provide a space or flow passage 53 surrounding the tube 49. The housing 52 is shown provided with a fitting 54 connected to the air hose or pipe 56 whereby air under pressure can be continuously supplied to the housing to form a continuously flowing stream of air or other gas through the housing and out through the open end which generally surrounds the probe 48. The conductor 47 is connected to a lead wire 57 which connects with suitable electronic circuitry. The probe assembly is disposed within the hopper 21 substantially in the manner illustrated in FIG. 8. The upper end of the assembly may be provided with a suitable bracket 58 for removable attachment to the hopper 21, and the lower end is disposed whereby the probe 48 extends in a general vertical direction toward the material within the tube 11. The electronic circuitry is illustrated in FIG. 8. Block 59 which connects with lead 57 represents electronic circuitry responsive to contact of the probe 48 with the upper surface layer of material within the tube 11. Such material is indicated at 60 in FIG. 8 and the upper level at 61. When the surface 61 reaches a predetermined level or height, electrical contact is made to the probe 48 and the wet material, and a conductive path is established from the probe through the wet conductive material to the grounded metal of the tube 11. The circuitry is so constructed that it generates a signal response to the establishment of such a conductive path through the wet material, and the response is applied to the switch relay 62 which controls energizing of the motors 63a, 63b, 63c for driving the shaker conveyer, the eccentric 39 and the cross-conveyer 37. As indicated in FIG. 8, the signal generated by circuitry 59 can be applied to a solenoid valve 64 which controls supply of hydraulic fluid under pressure to the hydraulic motors 63a, 63b and 63c.

To prevent false signals due to momentary contact with the probe and rapid cycling "on-off" of the motors 63a, 63b and 63c, the circuitry includes an electronic time delay which can be adjusted to a selected period over a range of from ½ to 1½ seconds. If the contact does not persist for the time delay, no signal response is generated. Thus wet material (e.g., spinach leaves) may rain down about the probe with ocassional momentary contacts of a duration less than the time delay without stopping the driving motors. The airflow downwardly about the probe also tends to minimize false signals by blanketing the probe in such a manner as to prevent substantially continuous contact of the probe with falling wet material, as for example wet leaves which may simultaneously contact both the probe and the top of the column. Circuitry of this type is commercially available. Particular circuitry that has been found satisfactory is manufactured by Electronics Corporation of America and is identified as type 22DJ9, Model 3000.

As previously mentioned, air is discharged continuously from the lower end of the probe assembly and about the probe 48. This continuous flow of air or other gas serves to prevent moisture from entering the probe assembly, thus avoiding possible short-circuiting or false operation. In addition, it maintains the lower end of the assembly free of material being delivered downwardly into the hopper, and avoids any hang-up of material on the lower end of the housing 52 or on the probe 48. Also it assists in preventing false operations as previously described.

FIGS. 9-12 illustrate mounting and supporting means for the rollers 42 and 43 which enable the various desired adjustments. It consists of a frame 66 comprising the parallel and generally upright members 67 which have their upper ends fixed to the end portions of the crossmember 68. The end portions of member 68 are also fixed to the upright members 69, which at their upper ends are fixed to the cross-member 71. Upright members 72 are tubes that may be square in section and which slidably interfit the members 69. These members 72 are connected to suitable means whereby they can be raised or lowered in unison to a desired adjusted position. The means illustrated consists of sprockets 73 which engage a common endless chain 74 that is normally tensioned by the idler sprocket 75 carried by the adjustable arm 76. The sprockets 73 are fixed to shafts 77 which extend downwardly into the structural members 69. The upper portions of these shafts are carried by bearing assemblies 78 which are mounted upon the upper ends of the members 69. The lower portions of the shafts within the structural members 69 are threaded and engage nuts 77a that are secured to the upper ends of the tubes 72. The means illustrated for simultaneously turning the sprockets 73 consists of shafts 79 and 80 which have meshing miter gears 81 and 82. Shaft 79 is carried by the journal blocks 83 that are mounted upon the corresponding vertical structural member 69, and shaft 80 is carried by bearings 84 and 85 that are mounted upon a bracket 86 that is secured to the corresponding structural member 69. A crank 87 is secured to the shaft 80 for manual rotation. A gear 88 fixed to the upper end of shaft 79 engages a gear 89 which is secured to the shaft upon which the sprocket 73 is mounted. Thus manual rotation of crank 87 serves to rotate the sprocket 73 whereby both sprockets are rotated in the same direction to raise or lower the tubes 72.

In place of the means described above for raising or lowering the rollers, other types of elevating and lowering means can be employed, such as simpler mechanism of the lever type.

At one end of the assembly one end of each of the rollers 42 and 43 is journalled in a gear box 91. For purposes of adjustment, a sector plate 92 is secured to the gear box and is provided with a plurality of holes disposed along an arc having at its center the axis of the roller 42. The gear box 91 together with its sector plate 92 is carried by the lower end of the corresponding tube member 72, the arrangement being such that the gear box may be turned relative to member 72 about the axis of the lower roller 42. A suitable driving motor 93, such as one of the hydraulic fluid type, is mounted upon the housing of the gear box 91, and the gears within this box are such that both of the rollers 42 and 43 are driven in the same direction and at the same speed.

The other ends of the rollers 42 and 43 are journalled in the bearing block 94, which also is secured to a sector plate 96 corresponding to the sector plate 92. This block is also carried by the lower end of the corresponding member 72 in such a manner as to permit its rotation about the axis of the lower roller 42.

Means is provided for adjusting the position of the rollers 42 and 43 relative to the underlying conveyer. To facilitate such adjustment and to maintain the sectors 92 and 96 locked during normal operation, a releasable locking pin arrangement is provided as follows. Two aligned rock levers 97 and 98 are mounted on the exterior side of the mounting member 67 by brackets 99 and 100. The adjacent ends of these levers are loosely connected at 101. A clevis 102 is pivotally connected with the lower end of lever 98, and a similar clevis 103 is pivotally connected to lever 97. Lever 97 has an upper extension 104 to which the ring or bail 106 is attached for manual operation. Clevis 102 is attached to a rod 107 which forms a lock pin 108 for engaging one of the holes 109 of the sector 92. Clevis 103 similarly connects with the link rod 111 which in turn connects with the clevis 113. One arm of a rock lever 114, which likewise is carried by the corresponding frame member 67, is connected to clevis 113 and the other arm lever connects with clevis 116. Rod 117 is attached to clevis 116 and its end portion 118 forms a lock pin adapted to engage in one of the holes 119 of the sector plate 96.

Normally the assembly described above may be urged to locking position by spring means (not shown) with the lock pins 111 and 118 engaged in corresponding ones of the holes of sector plates 92 and 96. When it is desired to change the relative positioning of the rollers 42 and 43, the operator manually engages the ring 106 and pulls outwardly whereby the pins 111 and 118 are simultaneously retracted from the sector plqtes 92 and 96, thus permitting these plates together with the gear box 91 and the bearing block 94 to be rotated about the axis of the lower roller 42. After the desired adjustment has been made, return of the lever 97 to its normal position shown in FIG. 8 serves to lock the sectors in the new adjusted position. The gear box and bearing block 94 are shown secured to a rigid yoke 95 to prevent angular twisting of one relative to the other.

When the assembly shown in FIGS. 1-12 is installed to operate upon the upper run of a conveyer belt, the frame members 67 are located at the sides of the conveyer, and their lower ends are fixed to the conveyer framework or to a separate framework which is stationary with respect to the conveyer frame. As previously explained, the rollers are arranged to extend at an angle to the direction of movement of the conveyer belt, as for example, an angle of from 30° to 45°. The lower portion of the peripheral surface of roller 42 is disposed to contact the upper smooth surface of the conveyer belt, the contacting pressure being sufficient to prevent any of the wet material from finding its way between this roller and the belt. The amount of contacting pressure can be adjusted by turning the crank 87. In addition to this possible adjustment turning of the crank 87 makes it possible to elevate the rollers from the belt conveyer to an out-of-the-way position where it does not act upon the material being conveyed. When so positioned, no material is acted upon by the rollers.

FIG. 4 schematically illustrates how a plant installation may include a plurality of can filling units arranged along a distribution conveyer. The can filling units A–F are distributed along the length of the distribution conveyer 31, and each unit is provided with material by the action of the barriers 33 of the roller type as previously described. A common supply conveyer 31a may supply the wet material to a number of conveyers 31 distributed within the plant. An additional barrier unit 33 of the roller type can be used to transfer a proper amount of material from conveyer 31a to conveyer 31. Each of the barrier units 33 is of a proper height with a proper inclination to divert a desired amount of material to its corresponding can filling unit. Thus for the first unit A a sufficient amount of material is sheared from the bottom of the mass for handling the capacity of the corresponding can filling apparatus, but leaving a sufficient amount of material to spill over the barrier to supply the remaining units. Thus assuming, for example, that there are eight units distributed along the distribution conveyer with a proper supply of material being carried by the distribution conveyer, all of the eight units are provided with proper amounts of the material for continuous can filling operations, without manual labor or manually supervised diverting equipment.

In the foregoing description, reference is made to conveying, feeding and can filling operation of various wet materials. Particular reference is made to blanched leaf spinach which is a limp leafy material. Other wet materials that may be handled include sauerkraut which is limp and stringy, and blanched french sliced green beans. Also materials having some of the same properties of the foregoing materials are shoestring carrots and beets, and blanched leafy vegetables such as cabbage, kale and collard greens.

While the roller assembly for diverting material from a conveyer is deemed desirable for use with can filling apparatus of the type described, it may be used for other purposes where it is desired to shear off and divert material from a conveyer belt, and particularly materials which cannot be effectively diverted by conventional means.

What is claimed is:

1. In material conveying apparatus applicable to conveying wet material, a belt conveyer, at least two first and second parallel rollers extending across and overlying an upwardly faced run of the conveyer, said run moving in one direction and having a smooth upper surface for supporting and conveying wet material, the first roller having its peripheral surface in juxtaposition with the belt surface, the second roller having its peripheral surface disposed in juxtaposition with the peripheral surface of the first roller, said rollers as viewed in plan extending across the belt at an angle less than 90° and means for driving the rollers in the same direction of rotation, the direction of rotation being such that the lower portion of the peripheral surface of the first roller turns in a direction opposite to the direction of movement of the conveyer belt underlying the same, said rollers forming barrier means for diverting wet material off one side of the belt.

2. Material conveying apparatus as in claim 1 in which the axes of the rollers are coincident with a plane that is inclined toward the direction of movement of the conveyer belt.

3. Apparatus as in claim 1 in which the axes of the rollers are coincident with a common plane and means is provided for adjusting the positioning of the rollers relative to the conveyer belt to vary the inclination of said plane relative to the surface of the belt.

4. Apparatus as in claim 1 together with means for journalling and supporting the ends of the rollers.

5. Apparatus as in claim 4 in which the means for journalling and supporting the ends of the rollers enables raising of the rollers to an out-of-the way position relative to the belt.

6. Apparatus for conveying wet material and for introducing measured amounts of such material into cans, comprising an upright tube having a feed hopper communicating with its upper open end for receiving moist material, means at the lower end of the tube for continually severing measured amounts of the material, the material in the tube forming a column that is subject to increasing compaction as it progresses to the lower end of the tube from the upper end, a conveyer belt for moving the wet material in one direction to a region located at a level above the upper end of the tube, means in said region for diverting wet material from one side of the conveyer belt, a surge hopper having an upper open end disposed to receive the diverted material, and means for receiving the wet material from the lower end of the surge hopper and for dropping the same into the feed hopper, said means for diverting wet material from the moving conveyer belt consisting of rollers extending across and overlying an upwardly faced run of the conveyer, said rollers being in juxtaposition, with a fist roller being in juxtaposition with the upper surface of the conveyer belt, said rollers being parallel to each other and extending at an angle across the conveyer belt that is less than 90°, and means for driving the rollers in the same direction of rotation, the direction of rotation being such that the lower portion of the lowermost roller turns in a direction opposite to the direction of movement of the conveyer belt.

7. A method for diverting wet material from the upper run of a belt conveyer that is moving in one direction, the method comprising positioning at least two parallel rollers to extend across the overlie the upper run of the conveyer with the rollers extending at an angle of less than 90° to said direction of movement of the conveyer, driving the rollers in the same direction of rotation, causing the lowermost roller to have its lower peripheral surface in contact with the conveyer and the second roller in close proximity with the first roller, the direction of rotation of the rollers being such that the lower peripheral surface of the first roller moves in a direction opposite to the direction of the movement of the conveyer, the rollers forming a barrier which shears off the wet material and diverts the same from the conveyer.

8. A method as in claim 7 in which the axes of the rollers are coincident with a plane that is inclined in the direction of movement of the conveyer belt.

9. A method as in claim 8 in which the inclination of the plane is adjusted to vary the amount of material diverted from the conveyer.

10. In a method for conveying wet material and for introducing measured amounts of such material into cans, the method making use of an upright tube having its upper open end communicating with a feed hopper for receiving moist material and having means at the lower end of the tube for continually severing measured amounts of the material, a conveyor belt being employed for moving the wet material in one direction to a region at a level above the upper end of the tube, the method comprising diverting wet material from one side of the conveyor belt, receiving the diverted material in an upright surge hopper, feeding the wet material from the lower end of the surge hopper to the region above the feed hopper and then dropping the material into the feed hopper whereby a column of the material is maintained within the tube in which the wet material is diverted from the moving conveyer belt by positioning at least two rollers across the upwardly faced run of the conveyer with the rollers being in parallel relationship and in close juxtaposition with the lowermost roller being in contact with the upper surface of the conveyer belt, the rollers extending at an angle across the conveyer belt that is less than 90° to form a barrier extending across the conveyer, and driving the rollers in the same direction of rotation, the direction of rotation being such that the lower peripheral surface of the lowermost roller turns in a direction opposite to the direction of movement of the conveyer belt.

* * * * *